United States Patent
Mauer

(10) Patent No.: US 10,136,384 B1
(45) Date of Patent: Nov. 20, 2018

(54) METHODS AND APPARATUS FOR PERFORMING BUFFER FILL LEVEL CONTROLLED DYNAMIC POWER SCALING

(71) Applicant: Altera Corporation, San Jose, CA (US)

(72) Inventor: Volker Mauer, Princes Risborough (GB)

(73) Assignee: Altera Corporation, San Jose, CA (US)

( * ) Notice: Subject to any disclaimer, the term of this patent is extended or adjusted under 35 U.S.C. 154(b) by 455 days.

(21) Appl. No.: 14/514,211

(22) Filed: Oct. 14, 2014

(51) Int. Cl.
*H04W 52/02* (2009.01)
*H04L 12/861* (2013.01)

(52) U.S. Cl.
CPC ......... *H04W 52/0206* (2013.01); *H04L 49/90* (2013.01)

(58) Field of Classification Search
CPC . H04W 52/02; H04W 52/0216; H04W 84/12; H04W 52/0229; H04W 84/18
See application file for complete search history.

(56) References Cited

U.S. PATENT DOCUMENTS

| | | | | |
|---|---|---|---|---|
| 4,804,954 A * | 2/1989 | Macnak | ............... | G08B 3/1016 340/7.34 |
| 4,864,543 A * | 9/1989 | Ward | ........................ | G06F 5/12 365/189.07 |
| 5,557,751 A * | 9/1996 | Banman | ................. | G06F 13/385 375/219 |
| 5,935,213 A * | 8/1999 | Rananand | ........... | H04L 12/5601 709/200 |
| 6,081,843 A * | 6/2000 | Kilkki | ................ | H04Q 11/0478 709/232 |
| 6,097,698 A * | 8/2000 | Yang | ................... | H04Q 11/0478 370/231 |
| 6,145,033 A * | 11/2000 | Chee | ......................... | G06F 5/12 710/52 |
| 6,715,007 B1 * | 3/2004 | Williams | ................ | H04L 47/10 710/52 |
| 6,778,499 B1 * | 8/2004 | Senarath | ................. | H04L 47/10 370/232 |

(Continued)

*Primary Examiner* — Mark Rinehart
*Assistant Examiner* — Sanjay K Dewan
(74) *Attorney, Agent, or Firm* — Treyz Law Group, P.C.; Jason Tsai

(57) ABSTRACT

Integrated circuits with wireless communications circuitry are provided. The wireless communications circuitry may include an input FIFO, an output FIFO, a processing module interposed between the input and output FIFOs, and dynamic power control circuitry that controls the performance of the processing module. The input and output FIFOs may provide fill level information to the processing module. The dynamic power control circuitry may analyze the current fill level information received from the input and output FIFOs and may increase the operating frequency and/or boost the power supply voltage of the processing module in response to detecting that the input FIFO is filling up faster than the output FIFO or may decrease the operating frequency and/or reduce the power supply voltage of the processing module in response to detecting that the output FIFO is filling up faster than the input FIFO.

15 Claims, 5 Drawing Sheets

(56) References Cited

U.S. PATENT DOCUMENTS

| | | | | |
|---|---|---|---|---|
| 6,978,242 B2* | 12/2005 | Hamada | ............... | H04W 28/06 704/503 |
| 6,981,069 B2* | 12/2005 | Hanna | ............... | G06F 3/1212 710/20 |
| 7,155,617 B2* | 12/2006 | Gary | ............... | G06F 1/26 703/21 |
| 7,222,314 B1* | 5/2007 | Miller | ............... | G06F 17/5045 716/103 |
| 7,398,414 B2* | 7/2008 | Sherburne, Jr. | ....... | G06F 1/3203 712/E9.063 |
| 7,437,582 B1* | 10/2008 | Parlour | ............... | G06F 1/12 327/530 |
| 7,548,585 B2* | 6/2009 | Kent, Jr. | ............ | H04L 29/06027 375/240.25 |
| 7,733,892 B2* | 6/2010 | Cui | ............... | G06F 12/023 370/230 |
| 8,176,386 B1* | 5/2012 | Sutardja | ............... | G11B 20/18 714/763 |
| 8,193,831 B1* | 6/2012 | Kadosh | ............... | G06F 1/08 326/46 |
| 8,458,497 B2* | 6/2013 | Du | ............... | G06T 1/20 345/506 |
| 8,565,135 B2* | 10/2013 | Husted | ............... | H04W 52/0229 370/311 |
| 8,854,963 B1* | 10/2014 | Muma | ............... | H04B 10/27 370/231 |
| 9,111,059 B2* | 8/2015 | Pattichis | ............... | G06F 17/5054 |
| 9,307,505 B2* | 4/2016 | Zhu | ............... | H04W 52/243 |
| 9,312,723 B2* | 4/2016 | Nagata | ............... | H02J 7/0072 |
| 9,467,150 B2* | 10/2016 | Tidwell | ............... | G06F 1/32 |
| 9,608,922 B2* | 3/2017 | Monchiero | ......... | G06F 15/7825 |
| 2004/0156624 A1* | 8/2004 | Kent, Jr. | ............... | H04N 5/775 386/263 |
| 2005/0086553 A1* | 4/2005 | Spencer | ............... | G06F 1/04 713/600 |
| 2006/0174148 A1* | 8/2006 | Yang | ............... | G06F 1/3203 713/322 |
| 2007/0019686 A1* | 1/2007 | Belk | ............... | H04J 3/0632 370/516 |
| 2007/0046344 A1* | 3/2007 | Minzoni | ............... | G11C 7/22 327/158 |
| 2007/0139014 A1* | 6/2007 | Girson | ............... | G06F 1/3203 320/132 |
| 2009/0028171 A1* | 1/2009 | Cousson | ............... | H04L 47/10 370/412 |
| 2009/0204834 A1* | 8/2009 | Hendin | ............... | G06F 1/22 713/323 |
| 2009/0207770 A1* | 8/2009 | Fayfield | ............... | H04Q 9/00 370/311 |
| 2010/0156450 A1* | 6/2010 | Inada | ............... | H03K 19/00384 324/750.3 |
| 2010/0248678 A1* | 9/2010 | Babitch | ............... | G01S 19/23 455/343.1 |
| 2010/0250129 A1* | 9/2010 | Babitch | ............... | G06F 1/32 701/469 |
| 2012/0005513 A1* | 1/2012 | Brock | ............... | G06F 1/3203 713/340 |
| 2012/0235839 A1* | 9/2012 | Mazumdar | ............... | H04L 49/40 341/50 |
| 2014/0013021 A1* | 1/2014 | Matsumoto | ............. | G06F 13/24 710/267 |
| 2014/0165021 A1 | 6/2014 | Pattichis et al. | | |
| 2014/0191734 A1* | 7/2014 | Kuang | ............... | G06F 1/3206 323/234 |
| 2014/0210510 A1* | 7/2014 | Chromczak | ............... | G06F 1/10 326/33 |
| 2014/0310549 A1* | 10/2014 | Herbeck | ............... | G06F 1/324 713/322 |
| 2015/0356050 A1* | 12/2015 | Smith | ............... | G06F 13/4226 710/313 |
| 2016/0157187 A1* | 6/2016 | Zhu | ............... | H04W 52/243 370/311 |
| 2016/0259391 A1* | 9/2016 | Tidwell | ............... | G06F 1/324 |

* cited by examiner

METHODS AND APPARATUS FOR PERFORMING BUFFER FILL LEVEL CONTROLLED DYNAMIC POWER SCALING

BACKGROUND

This relates generally to integrated circuits, and more particularly, to integrated circuits with wireless communications circuitry.

Wireless integrated circuits are often used in wireless base transceiver stations to provide wireless communications capabilities (as an example). Since the operating cost for a base station is proportional to the amount of power consumption, it is generally desirable to minimize power consumption on the wireless integrated circuits.

In one conventional method, a programmable integrated circuit is organized into regions referred to as tiles, where each tile can either be statically operated in a low power mode (i.e., by statistically biasing that tile with a low voltage) or in a high speed mode (i.e., by statically biasing that tile with a high voltage). This way of configuring tiles in either the low power mode or the high speed mode is referred to as static voltage scaling and is set once upon programming the integrated circuit and cannot be changed during normal operation.

In another conventional method, an integrated circuit has different portions that can be configured in different power modes using high level system software. For example, software controlled time-division-duplexing (TDD) switches can be used to power down parts of the transmit circuitry during certain time slots and to power down parts of the receiver circuitry during other time slots. The different power modes are, however, not a direct function of the required processing capability of the transmit and receive circuitry.

SUMMARY

An integrated circuit having wireless communications capabilities is provided. In accordance with an embodiment, the integrated circuit may include an input FIFO, and output FIFO, and a processing module (e.g., a wireless transmit processing module or a wireless receive processing module) coupled between the input and output FIFOs. The integrated circuit may also include dynamic power control circuitry that receives fill level information from the input and output FIFOs and that adjusts the performance of the processing module based on the received fill level information.

The dynamic power control circuitry may adjust the performance of the processing module by dynamically adjusting the operating frequency of the processing module and/or a power supply voltage that biases the processing module. In one embodiment, the power control circuitry may increase the performance of the processing module in response to detecting that the input FIFO is filling up faster than the output FIFO and reduce the performance of the processing module in response to detecting that the output FIFO is filling up faster than the input FIFO. The dynamic power control circuitry may adjust the performance of the processing module based on a lookup table that is stored on the integrated circuit.

In another suitable embodiment, the power control circuitry may hold the performance of the processing module at a fixed level for a range of FIFO fill levels. For example, the power control circuitry may hold the power consumption of the processing module at a fixed level when the fill level of a FIFO is between a first predetermined target amount and a second predetermined target amount and that adjusts the power consumption of the processing module at a given rate when the fill level of the FIFO is less than the first predetermined target amount and when the fill level of the FIFO is greater than the second predetermined amount. In general, the power control circuitry may adjust the performance of the processing module at a first rate in response to detecting deviations at the input FIFO and at a second rate that is different than the first rate in response to detecting deviations at the output FIFO.

Further, features of the present invention, its nature and various advantages will be more apparent from the accompanying drawings and the following detailed description.

DETAILED DESCRIPTION

An integrated circuit with wireless communications capabilities is provided. In accordance with an embodiment, a wireless integrated circuit may include a baseband processor, an antenna, and a transceiver coupled between the baseband processor and the antenna. The transceiver may include transmitter circuitry in a transmit (TX) path and receiver circuitry in a receive (RX) path. The transmitter circuitry and the receiver circuitry may each include an input first-in first-out (FIFO) circuit, an output FIFO circuit, and processing module coupled between the input and output FIFO circuits.

To help minimize power consumption of the wireless integrated circuit, the integrated circuit may also include power control circuitry that is used to provide adjustable power supply voltage and/or clock signals to the processing module. In response to detecting that the input FIFO has a fill level exceeding a first predetermined threshold, the power control circuitry may dynamically increase the power supply voltage and/or increase the frequency of the clock signal that is fed to the processing module so that the processing module can increase the speed at which information is retrieved from the input FIFO (and vice versa). In response to detecting that the output FIFO has a fill level exceeding a second predetermined threshold, the power control circuitry may adaptively decrease the power supply voltage and/or lower the frequency of the clock signal that is fed to the processing module so that the processing module outputs information to the output FIFO at a slower rate (and vice versa).

The methods and apparatus described herein may be incorporated into any suitable circuit. For example, the method and apparatus may also be incorporated into numerous types of devices such as microprocessors, digital signal processors, application specific standard products (ASSPs), application specific integrated circuits (ASICs), programmable array logic (PAL), programmable logic arrays (PLAs), field programmable logic arrays (FPLAs), electrically programmable logic devices (EPLDs), electrically erasable programmable logic devices (EEPLDS), logic cell arrays (LCA), field programmable gate arrays (FPGAs), just to name a few.

Figure 1:
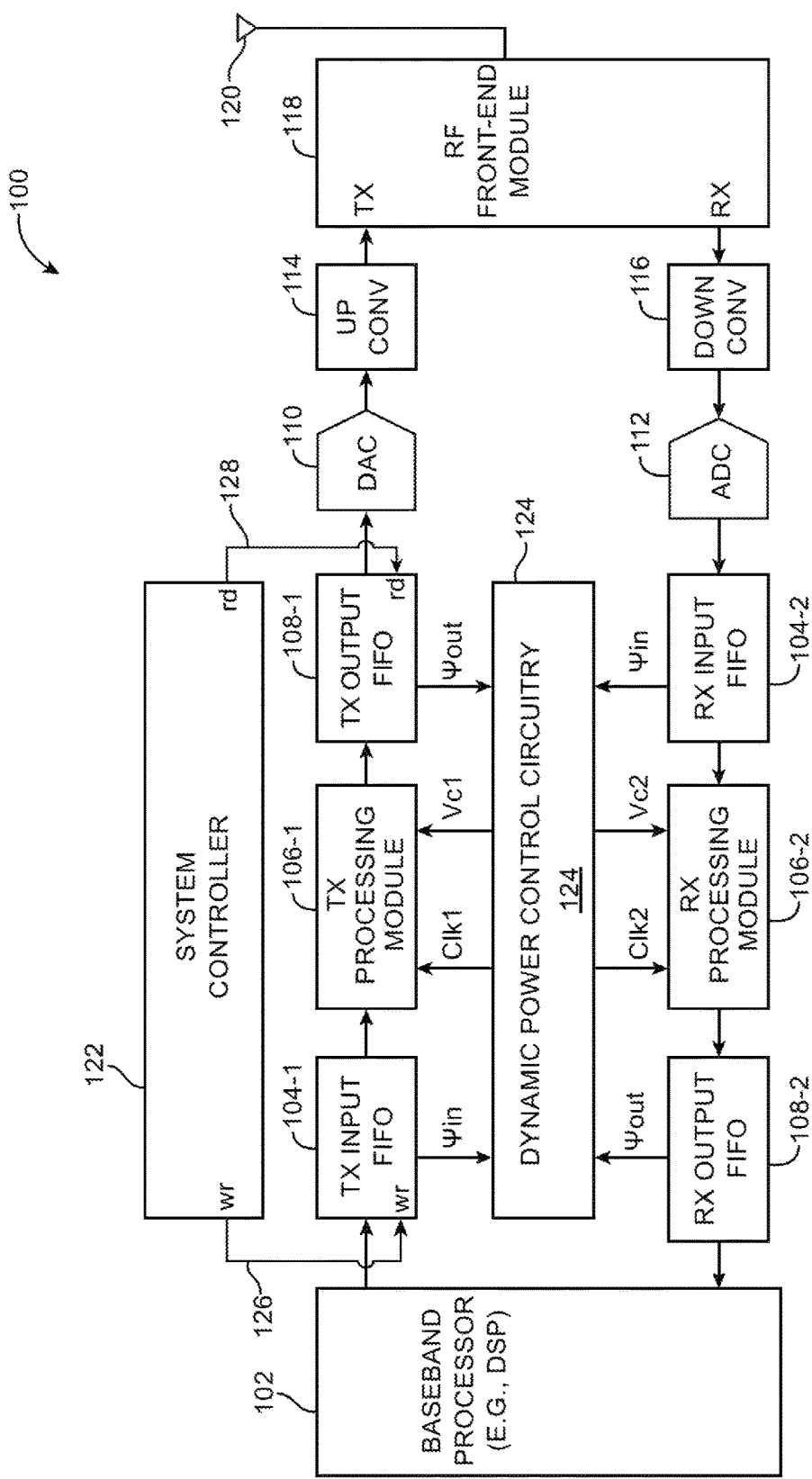
FIG. 1 is a diagram of illustrative wireless communications circuitry in accordance with an embodiment.

In one suitable embodiment of the present invention, integrated circuits are used in wireless communications circuitry that supports radio-frequency communications capabilities. As shown in FIG. 1, wireless communications circuitry such as wireless communications circuitry 100 may include a baseband processor 102, a transceiver and associated control circuitry, a radio-frequency (RF) front-end module 118, and an antenna 120. Wireless communication circuitry 100 may be implemented on one or more integrated circuits. In one suitable arrangement, baseband processor 102, the transceiver and the front-end module 118 are all formed as part of a single integrated circuit die. In another suitable arrangement, baseband processor 102 may be formed on one die, whereas the transceiver and the front-end module 118 are formed on another die. In yet another suitable arrangement, baseband processor 102, the transceiver, and front-end module 118 are each formed on separate integrated circuit dies.

Baseband processor 102 (sometimes referred to as a digital signal processor or "DSP") may be used to handle raw and processed data associated with wireless (antenna) performance metrics for received signals such as received power, transmitted power, frame error rate, bit error rate, channel quality measurements based on signal-to-interference ratio (SINR) and signal-to-noise ratio (SNR) information, channel quality measurements based on signal quality data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 100.

Processor 102 may directly interface with the transceiver. As shown in FIG. 1, the transceiver may include a transmit (TX) input FIFO circuit 104-1, a transmit processing module 106-1, and a transmit output FIFO circuit 108-1 in the transmit path and may also include a receive (RX) input FIFO circuit 104-2, a receive processing module 106-2, and a receive output FIFO circuit 108-2 in the receive path. The TX FIFOs 104-1 and 108-1 may sometimes be referred to respectively as transmit inbox and outbox buffers, whereas the RX FIFOs 104-2 and 108-2 may sometimes be referred to respectively as receive inbox and outbox buffers.

Transmit input FIFO 104-1 may have an input that receives transmit data from baseband processor 102 and an output that feeds transmit processing module 106-1. Transmit processing module 106-1 may perform any number of desired signal processing operations on the transmit data received from transmit input FIFO 104-1 and may provide the processed transmit data to the input of transmit output FIFO 108-1. Transmit output FIFO 108-1 may serve to buffer the processed transmit data and selectively output the processed transmit data to digital-to-analog converter (DAC) 110 to convert the transmit data into analog signals.

The converted analog signals may then be fed through up-conversion circuit 114 to convert the signals from baseband to higher frequencies that are suitable for wireless transmission. Up-conversion circuit 114 may be coupled to the transmit port of RF front-end module 118. The transmit circuitry described above is merely illustrative. If desired, other suitable wireless components (e.g., matching circuits, filters, amplifiers, etc.) may be interposed in the transmit path to help with the wireless transmission of data via antenna 120.

Wireless signals that are received at antenna 120 may be fed to the receive (RX) port of front-end module 118. The received signals may be fed through a down-converter 116 to convert the signals from radio-frequencies down towards baseband frequencies. The down-converted signals may then be fed through analog-to-digital converter (ADC) 112 to convert the received analog signals into corresponding digital signals.

Receive input FIFO 104-2 may have an input that receives the RX digital data from data converter 112 and an output that feeds receive processing module 106-2. Receive processing module 106-2 may perform any number of desired signal processing operations on the data received from RX input FIFO 104-2 and may provide the processed receive data to the input of transmit output FIFO 108-2. Receive output FIFO 108-2 may serve to buffer the processed receive data and selectively output the processed RX data to baseband processor 102. The receive circuitry described above is merely illustrative. If desired, other suitable wireless components may be interposed in the receive path to help with the wireless reception of data in circuitry 100.

Wireless communications circuitry 100 may also include a system controller such as system controller 122 and associated dynamic power control circuitry 124. System controller 122 (sometimes referred to as the applications controller) may at least be used to control when data is being loaded into the input FIFOs and when data is drawn from the output FIFOs.

As an example, system controller 122 may provide a write enable control input to transmit input FIFO 104-1 via path 126 and may provide a read enable control input to transport output FIFO 108-1 via path 128 (e.g., the write enable may be determined by the baseband sampling rate, whereas the read enable may be determined by the DAC operating clock). System controller 112 may also be used to provide a write enable control input signal to FIFO 104-2 and a read enable control input signal to FIFO 108-2 (not shown). In general, the TX/RX input FIFOs may receive read enable control signals from either controller 122 or the associated processing module, whereas the TX/RX output FIFOs may receive write enable control signals from either controller 122 or the associated processing module.

In accordance with an embodiment, dynamic power control circuitry 124 may be configured to adaptively adjust the performance of the transmit and receive processing modules based on the current state of the associated FIFOs. The FIFOs in the transmit and receive paths (e.g., FIFO circuits 104-1, 108-1, 104-2, and 108-2) may be configured to report the number of "used words" in some level of granularity that is reflective of its current fill level to dynamic power control circuitry 124. For example, input FIFOs 104-1 and 104-2 may provide corresponding input fill levels Ψin to circuitry 124, whereas output FIFOs 108-1 and 108-2 may provide corresponding output fill levels Ψout to circuitry 124.

Dynamic power control circuitry 124 may be adapted to control the voltage and clock for the transmit and receive processing modules as a function of system parameters such as the input and output FIFO fill levels. In the example of FIG. 1, power control circuitry may be used to provide power supply voltages Vc1 and Vc2 to TX processing module 106-1 and to RX processing module 106-2, respectively, and may also be used to provide clock signals Clk1 and Clk2 to TX processing module 106-1 and to RX processing module 106-2, respectively.

To increase the performance of the processing modules, circuitry 124 may increase the power supply voltages Vc1 and Vc2 and/or increase the frequencies Clk1 and Clk2. To decrease the performance of the processing modules, circuitry 124 may reduce the power supply voltage Vc1 and Vc2 and/or decrease the frequencies of Clk1 and Clk2. In one suitable approach, the voltage and clock frequencies may be scaled in tandem. In another suitable approach, only the voltage is scaled while the clock frequency is fixed. In yet another suitable approach, only the clock frequency is scaled while the voltage is kept constant. If desired, the transmit and receive processing modules may be adjusted separately (e.g., circuitry 124 may be used to increase the performance of TX processing module 106-1 while decreasing the performance of RX processing module 106-2, and vice versa). In general, the frequencies of Clk1 and Clk2 can be tuned by controlling a phase-locked loop (PPL) generating the different clock signals for circuitry 100.

In certain embodiments, power control circuitry 124 may also be configured to adjust the back body biasing of transistors in the transmit and receive processing modules to adjust the power mode. For example, power control circuitry 124 may provide a body biasing signal biases the bulk terminal of transistors in TX processing module 106-1 in a way that increases the threshold voltage of the transistors, thereby decreasing the performance while substantially reducing power consumption (i.e., by reducing leakage currents). As another example, power control circuitry 124 may provide a body biasing signal biases the bulk terminal of transistors in RX processing module 106-2 in a way that decreases the threshold voltage of the transistors, thereby enhancing the performance of module 106-2 at the expense of increased power consumption.

As described above, power control circuitry 124 may adjust the frequency (fclk) of the clock signals and the power supply voltages Vc based on the current fill level of the input and output FIFOs. Consider only the transmit FIFOs for the sake of clarity. On the input side, there should be sufficient headroom in the TX input FIFO 104-1 to accept more incoming data from the baseband processor. On the output side, there should be adequate data residing in the TX output FIFO 108-1 so that the system does not stall. To ensure that these requirements are met, a desired input fill level and desired output fill level may be pre-selected. The desired input and output fill levels are sometimes referred to as target operating points for the FIFOs. Then the actual operating level of the FIFOs deviates from these target operating points, the voltage and clock frequency can be scaled to reduce the detected deviation.

Figure 2A:
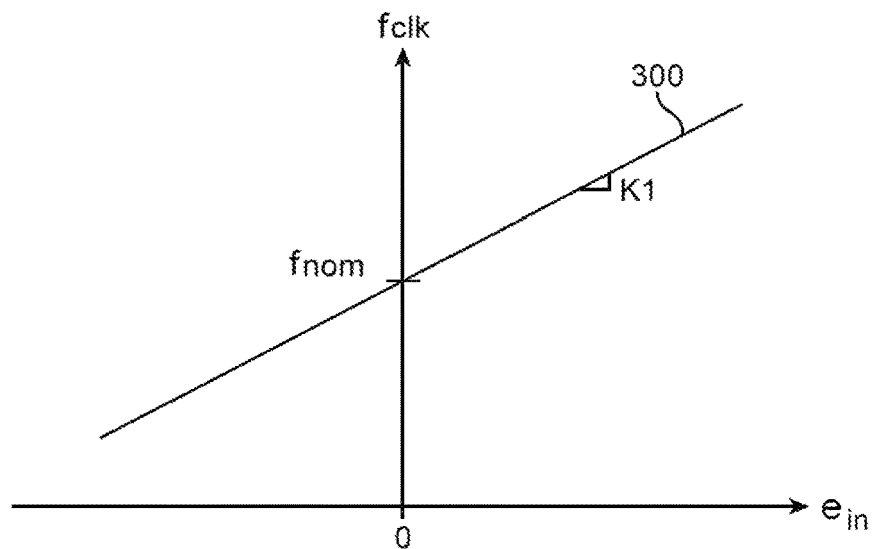
FIG. 2A. is a diagram showing how operating frequency can be scaled as a function of an input first-in first-out (FIFO) circuit fill level in accordance with an embodiment.

FIG. 2A is a plot showing how the operating clock frequency fclk of the processing module may be adjusted as a function of input error $e_{in}$. Error $e_{in}$ may be defined as the amount by which the current fill level of the input FIFO deviates from the target input operating point. As shown in FIG. 2A, the clock signal may be configured with a nominal frequency fnom when $e_{in}$ is equal to zero. However, whenever $e_{in}$ deviates from zero, fclk may be adjusted along line 300. Line 300 may have a positive slope k1 that determines how fast the system reacts to variations at the input FIFO. A positive slope indicates that fclk should be increased whenever the current fill level Ψin of the input FIFO exceeds the target amount and that fclk should be decreased whenever the current fill level Ψin of the input FIFO is less than the target amount.

Figure 2B:
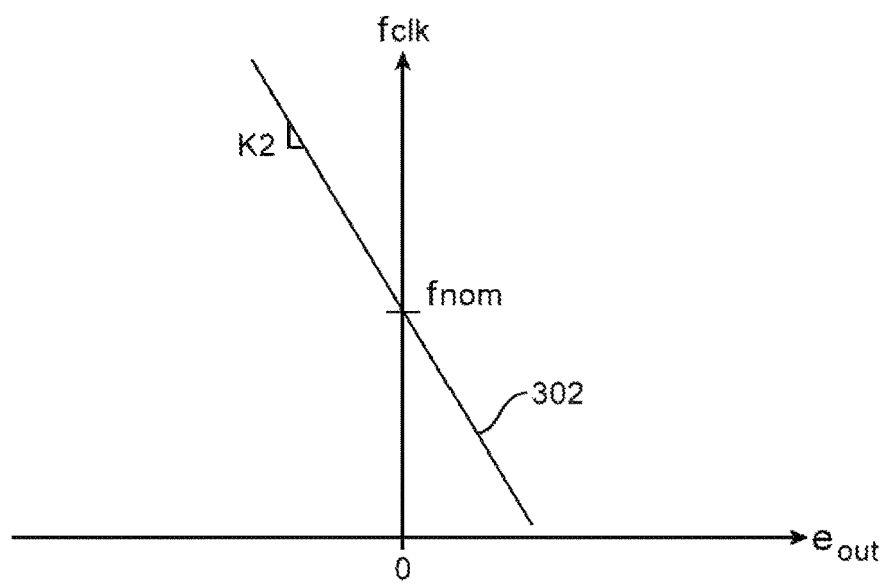
FIG. 2B. is a diagram showing how operating frequency can be scaled as a function of an output FIFO circuit fill level in accordance with an embodiment.

FIG. 2B is a plot showing how the operating clock frequency fclk of the processing module may be adjusted as a function of output error $e_{out}$. Error $e_{out}$ may be defined as the amount by which the current fill level of the output FIFO deviates from the target output operating point. As shown in FIG. 2B, the clock signal may be configured with a nominal frequency fnom when $e_{out}$ is equal to zero. However, whenever $e_{out}$ deviates from zero, fclk may be adjusted along line 302. Line 302 may have a negative slope k2 that determines how fast the system reacts to variations at the output FIFO. A negative slope indicates that fclk should be decreased whenever the current outbox fill level Ψout exceeds the target amount and that fclk should be increased whenever the current outbox fill level Ψout is less than the target amount.

FIG. 2A plots fclk as a function of $e_{in}$, whereas FIG. 2B plots fclk as a function of $e_{out}$. In practice, operating clock frequency fclk may be a function of both $e_{in}$ and $e_{out}$. As an example, dynamic power control circuitry 124 (FIG. 1) may be configured to adjust fclk in real time based on the following equation (1):

$$fclk = [0.5*(\Psi in\_targ + k1*e_{in})/\Psi in\_targ + 0.5*(\Psi out\_targ + k2*e_{out})/\Psi out\_targ]*fnom \quad (1)$$

where Ψin_targ represents the target input FIFO fill level, and where Ψout_targ represents the target output FIFO fill level. Constants k1 and k2 can be tuned individually to set the loop gain of the system. In general, the loop should be sufficiently sensitive so that the system can react quickly enough when the input FIFO approaches the upper target limit and when the output FIFO approaches the lower target limit.

Figure 3A:
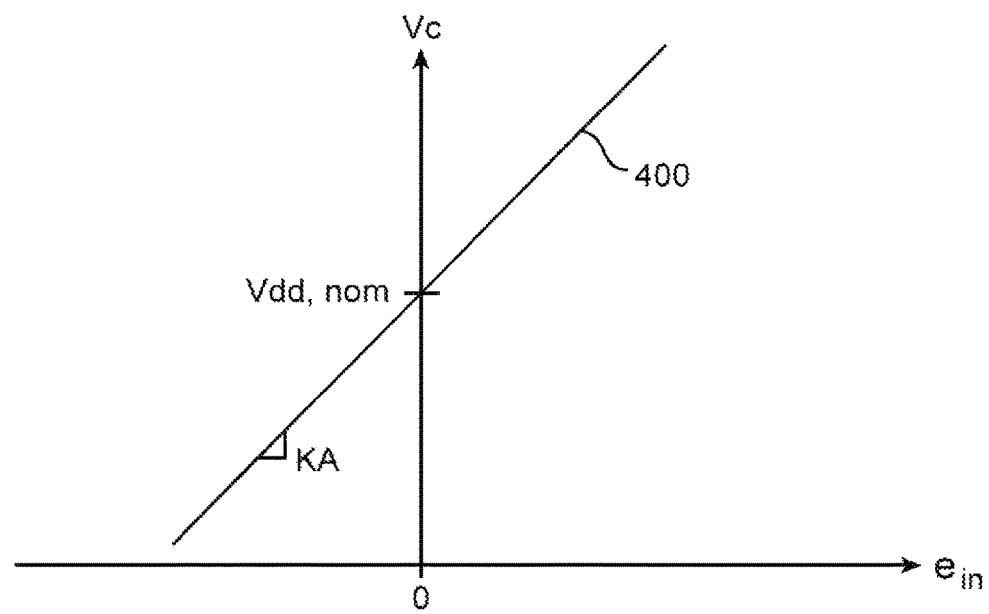
FIG. 3A is a diagram showing how power supply voltage can be scaled as a function of the input FIFO fill level in accordance with an embodiment.

Power control circuitry 124 may also be used to adjust the power supply voltage based on a similar scheme. FIG. 3A is a plot showing how power supply voltage Vc of the processing module may be adjusted as a function of input error $e_{in}$. As shown in FIG. 3A, voltage Vc may be driven to a nominal power supply voltage level Vdd,nom when $e_{in}$ is equal to zero. However, whenever $e_{in}$ deviates from zero, Vc may be adjusted along line 400. Line 400 may have a positive slope kA that determines how fast the system reacts to variations at the input FIFO. A positive slope indicates that Vc should be increased whenever the current fill level Ψin of the input FIFO exceeds a predetermined input threshold and that Vc should be decreased whenever the current fill level Ψin of the input FIFO is less than the predetermined input threshold.

Figure 3B:
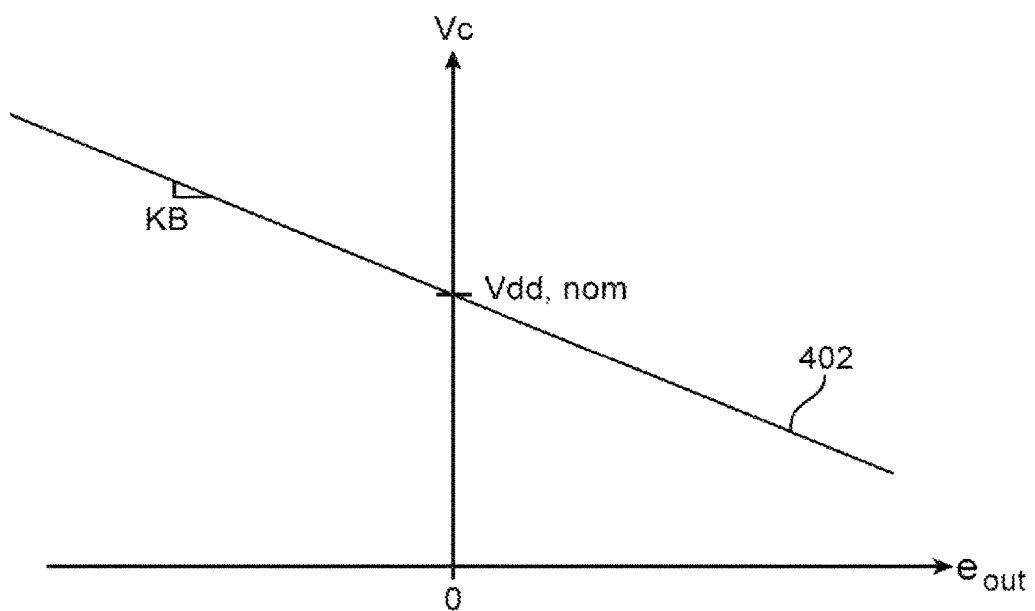
FIG. 3B is a diagram showing how power supply voltage can be scaled as a function of the output FIFO fill level in accordance with an embodiment.

FIG. 3B is a plot showing how Vc may be adjusted as a function of output error $e_{out}$. As shown in FIG. 3B, voltage Vc may be driven to nominal voltage level Vdd,nom when $e_{out}$ is equal to zero. However, whenever $e_{out}$ deviates from zero, Vc may be adjusted along line 402. Line 402 may have a negative slope kB that determines how fast the system reacts to variations at the output FIFO. A negative slope indicates that Vc should be decreased whenever the current outbox fill level Ψout exceeds the predetermined output threshold and that Vc should be increased whenever the current outbox fill level Ψout is less than the predetermined output threshold.

FIG. 3A. plots fclk as a function of $e_{in}$, whereas FIG. 3B plots fclk as a function of $e_{out}$. In practice, power supply voltage Vc may be a function of both $e_{in}$ and $e_{out}$. As an example, dynamic power control circuitry 124 (FIG. 1) may be configured to adjust Vc in real time based on the following equation (2):

$$Vc=[0.5*(\Psi in\_targ + kA*e_{in})/\Psi in\_{targ} + 0.5* (\Psi out\_targ + kB*e_{out})/\Psi out\_targ]*Vdd,nom \quad (2)$$

where Ψin_targ represents the predetermined input FIFO threshold, and where Ψout_targ represents the predetermined output FIFO threshold. Constants kA and kB can be tuned individually to set the loop gain of the system. In general, the loop should be sufficiently sensitive so that the system can react quickly enough when the input FIFO approaches the upper target limit and when the output FIFO approaches the lower target limit. If desired, the different fclk and Vc values corresponding to different $e_{in}$ and $e_{out}$ combinations may be stored in a lookup table on the integrated circuit so that equations (1) and (2) need not be computed on the fly.

The equation (1) and (2) are also merely illustrative. In other arrangement, the power control circuitry 124 may analyze the fill level information received from the input and output FIFOs and may increase fclk and/or boost Vc in response to detecting that the input FIFO is filling up faster than the output FIFO or may decrease fclk and/or reduce Vc in response to detecting that the output FIFO is filling up faster than the input FIFO.

Figure 4:
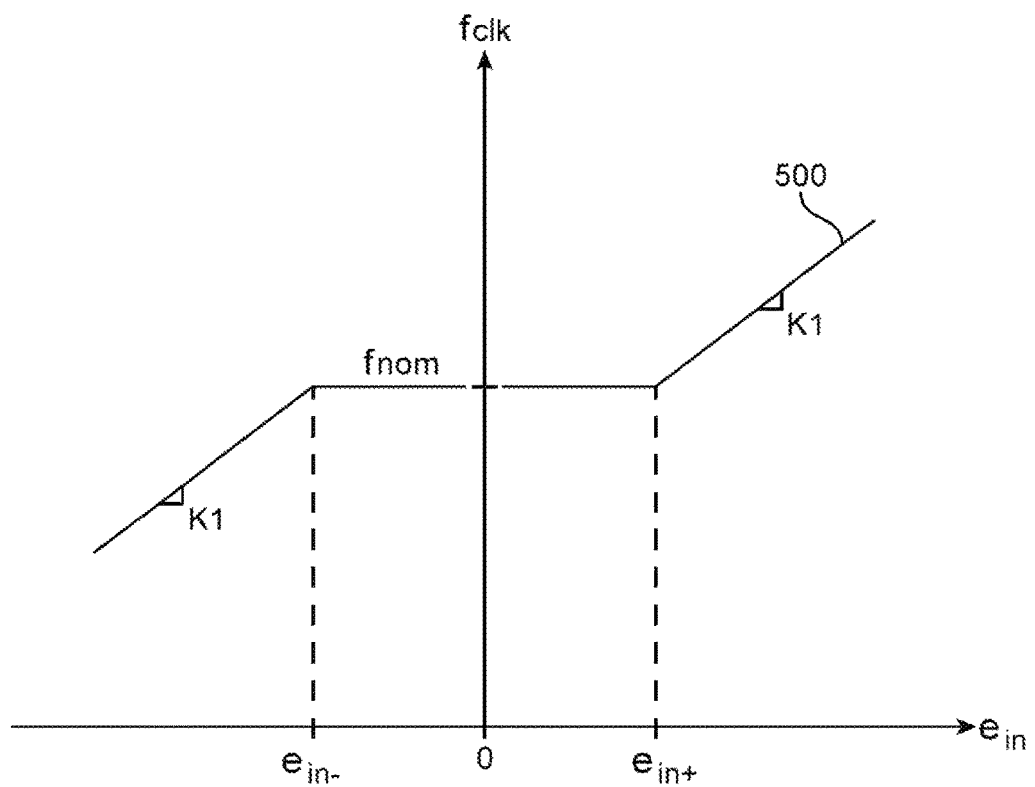
FIG. 4 is a diagram showing how operating frequency can be held constant for a predetermined range of input FIFO fill levels in accordance with an embodiment.

In applications where the wireless communications circuitry 100 of FIG. 1 is used to send bursts of data (e.g., data bits sent collectively in groups or packets), a range of acceptable fill levels can be defined instead of a single target fill level. FIG. 4 is a diagram showing how operating frequency fclk can remain at nominal clock frequency fnom for an input error $e_{in}$ lying between lower error boundary $e_{in-}$ and upper error boundary $e_{in+}$. For example, consider a scenario in which data is transmitted in packets each of which includes 64 words. In this example, $e_{in-}$ correspond to an input FIFO fill level Ψin of 128 data words, whereas $e_{in+}$ correspond to an Ψin of 256 data words. So when the current input FIFO fill level Ψin is between 128 and 256 words, fclk may be fixed at fnom. However, whenever $e_{in}$ deviates from predetermined range, fclk may be adjusted along line 500. Line 500 may have positive slope k1 that determines how fast the system reacts to variations at the input FIFO (e.g., fclk should be increased according to rate k1 when $e_{in}$ exceeds $e_{in+}$ and should be decreased along line 500 when $e_{in}$ is less than $e_{in-}$.

If desired, an acceptable range of fill levels may also be applied to the output FIFO (as a function of output FIFO error $e_{out}$). As described previously, fclk is generally a function of both $e_{in}$ and $e_{out}$, both of which can have a predefined range of acceptable error values. If desired, power supply Vc that is supplied to the processing modules can also be a function of both $e_{in}$ and $e_{out}$, both of which has a predetermined range of acceptable error values similar to that described in FIG. 4.

The examples above relating to the transmit input/output FIFOs 104-1 and 108-1 and the transmit processing module 106-1 described in connection with FIGS. 2A, 2B, 3A, 3B, and 4 are merely illustrative and do not serve to limit the scope of the present invention. In general, the same principles of using power control circuitry 124 (FIG. 1) to dynamically adjust fclk and power supply voltage level Vc can also be applied to circuitry in the receive path (e.g., the frequency of Clk2 and Vc2 being fed to receive processing module 106-2 may be scaled according to the fill levels of the receive input/output FIFOs 104-2 and 108-2, similar to method adapted by equations 1 and 2 above).

Figure 5:
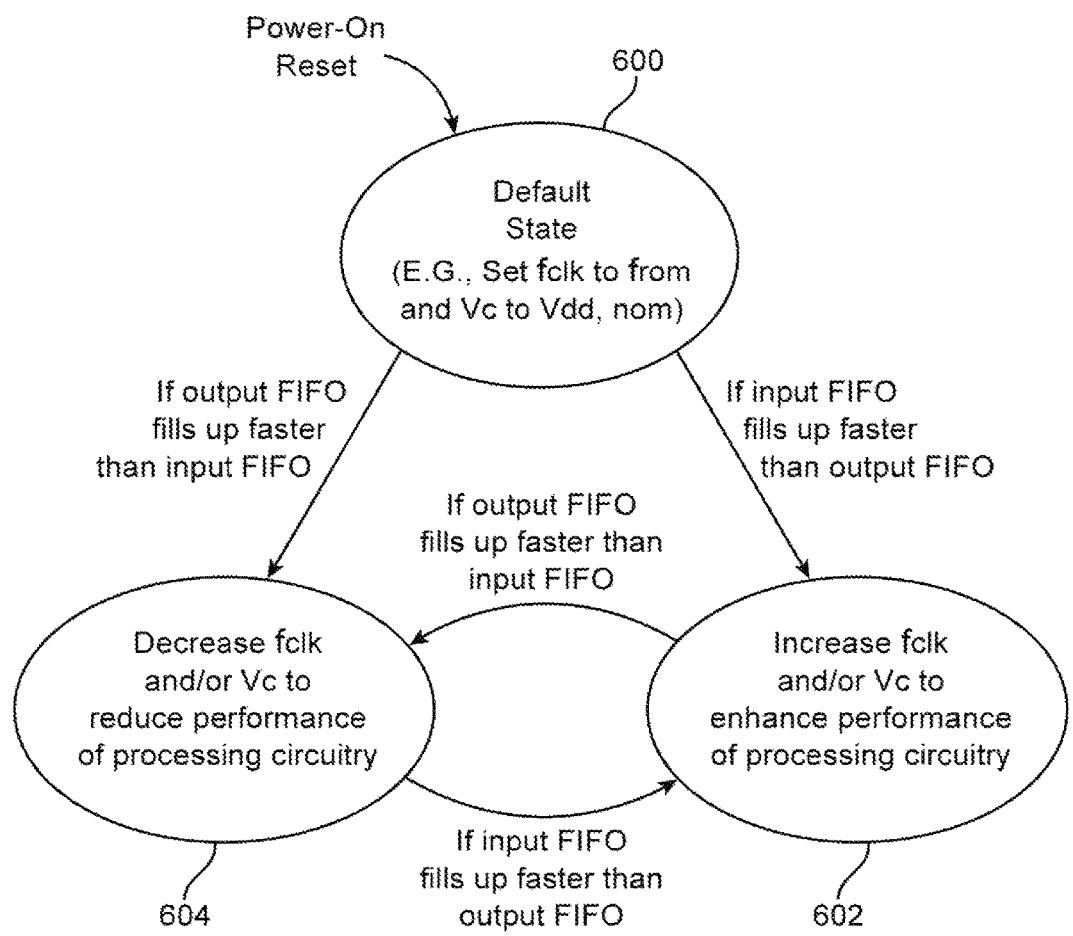
FIG. 5 is state diagram illustrating how voltage and/or clock frequency can be dynamically scaled as a function of required FIFO processing capability in accordance with an embodiment.

FIG. 5 is a state diagram illustrating how voltage and/or clock frequency can be dynamically scaled as a function of the required FIFO processing capability. As shown in FIG. 5, the wireless communications circuitry (e.g., circuitry 100 of FIG. 1) may be placed in a default state 600 upon power-on reset operations of the integrated circuit device. In the default state, the clock signal (e.g., the clock feeding the TX processing module or the clock feeding the RX processing module) may have a frequency fclk that is equal to the nominal frequency fnom, whereas the power supply voltage Vc (e.g., the bias voltage that is fed to the TX processing module or the RX processing module) may be set to nominal positive power supply voltage level Vdd,nom.

The input and output FIFOs associated with the TX and RX processing modules may provide fill level information to the processing modules. The TX and RX processing modules may receive the current fill level information from the FIFOs and determine whether to maintain, increase, or decrease fclk and Vc. In response to detecting that the input FIFO fills up faster than the output FIFO, power control circuitry 124 may be configured to increase fclk and/or Vc to enhance the performance of the associated processing module (in state 602). In response to detecting that the output FIFO fills up faster than the input FIFO, power control circuitry 124 may be configured to decrease fclk and/or Vc to reduce the performance of the associated processing module (in state 604).

The example of FIG. 5 in which power control circuitry 124 (FIG. 1) can be operated in three different states is merely illustrative and does not serve to limit the scope of the present invention. If desired, circuitry 124 may be operating in less than three states or more than three states to properly scale the power consumption and performance of the TX and RX processing modules based on the required processing at the input and output FIFOs in both the transmit and receive paths.

The embodiments described above in association with wireless communications circuitry are merely illustrative and are not intended to limit the scope of the present invention. If desired, the dynamic power control can be applied to wireline applications, radar systems, or any other systems with non-deterministic data load. For example, in wireline applications, it may be common to have a stream of packets being delivered by the system, where the exact number of packets are hard to predict. These systems may be designed to run at maximum packet rate, but would also benefit from the dynamic power savings when not running at the maximum rate. As another example, in radar systems, when no peaks are detected above a predetermined threshold, the radar sees empty space and as a result, the radar measurements can be slowed down until peaks (or targets) are found. When targets are detected, the processing of the radar unit can then be ramped up based on the number of targets that need to be processed.

The foregoing is merely illustrative of the principles of this invention and various modifications can be made by those skilled in the art without departing from the scope and spirit of the invention. The foregoing embodiments be implemented individually or in any combination.

What is claimed is:

1. An integrated circuit, comprising:
an input first-in first-out (FIFO) circuit;
an output first-in first-out (FIFO) circuit;
a processing module coupled between the input FIFO circuit and the output FIFO circuit; and
dynamic power control circuitry that receives fill level information from the input and output FIFO circuits and that adjusts the performance of the processing module based on the received fill level information, wherein the dynamic power control circuitry is configured to increase the performance of the processing module at a first rate of change in response to determining that the input FIFO circuit is filling up faster than the output FIFO circuit and is further configured to decrease the performance of the processing module at a second rate of change that is different than the first rate of change in response to determining that the output FIFO circuit is filling up faster than the input FIFO circuit.

2. The integrated circuit defined in claim 1, wherein the dynamic power control circuitry adjusts the performance of the processing module by dynamically adjusting an operating frequency of the processing module.

3. The integrated circuit defined in claim 2, wherein the dynamic power control circuitry adjusts the performance of the processing module by dynamically adjusting a power supply voltage that biases the processing module.

4. The integrated circuit defined in claim 1, wherein the dynamic power control circuitry adjusts the performance of the processing module by dynamically adjusting a power supply voltage that biases the processing module.

5. The integrated circuit defined in claim 1, wherein the dynamic power control circuitry adjusts the performance of the processing module according to a lookup table that is stored on the integrated circuit.

6. The integrated circuit defined in claim 1, wherein the dynamic power control circuitry holds the performance of the processing module at a fixed level for a range of FIFO circuit fill levels.

7. The integrated circuit defined in claim 1, wherein the input FIFO circuit, the processing module, and the output FIFO comprise part of wireless communications circuitry.

8. A method of operating an integrated circuit, comprising:
buffering data with an input first-in first-out (FIFO) circuit;
receiving the buffered data from the input FIFO at a processing module;
performing signal processing operations on the received buffered data using the processing module;
receiving the processed data from the processing module at an output first-in first-out (FIFO) circuit; and
with dynamic power control circuitry, receiving fill level information from the input and output FIFO circuits and adjusting the performance of the processing module based at least partly on the received fill level information by:
boosting the performance of the processing module at a first rate of change in response to detecting that the input FIFO circuit exhibits a fill level that is greater than a first target amount; and
reducing the performance of the processing module at a second rate of change that is different than the first rate of change in response to detecting that the output FIFO circuit exhibits a fill level that is greater than a second target amount.

9. The method defined in claim 8, wherein adjusting the performance of the processing module comprises:
using the dynamic power control circuitry to adjust an operating frequency of the processing module.

10. The method defined in claim 8, wherein adjusting the performance of the processing module comprises:
using the dynamic power control circuitry to adjust a power supply voltage that biases the processing module.

11. An integrated circuit, comprising:
a first-in first-out (FIFO) circuit having a fill level;
a processing module that is coupled to the FIFO circuit; and
power control circuitry that holds the power consumption of the processing module at a fixed level when the fill level of the FIFO circuit is between a first predetermined fill level and a second predetermined fill level and that adjusts the power consumption of the processing module at a given rate of change when the fill level of the FIFO circuit is less than the first predetermined fill level and when the fill level of the FIFO circuit is greater than the second predetermined fill level.

12. The integrated circuit defined in claim 11, wherein the FIFO circuit and the processing module comprise part of wireless communications circuitry.

13. The integrated circuit defined in claim 11, wherein the processing module has an input that receives data packets from the FIFO circuit.

14. The integrated circuit defined in claim 11, wherein the processing module has an output that feeds data packets to the FIFO circuit.

15. The integrated circuit defined in claim 11, further comprising:
an additional first-in first-out (FIFO) circuit having a fill level, wherein the processing module is interposed between the FIFO circuit and the additional FIFO circuit, and wherein the power control circuitry is further configured to dynamically adjust the power consumption of the processing module at least partly based on the fill level of the additional FIFO circuit.

* * * * *